(12) United States Patent
Wang et al.

(10) Patent No.: US 10,097,629 B2
(45) Date of Patent: *Oct. 9, 2018

(54) METHODS, SYSTEMS, DEVICES, AND PRODUCTS FOR PEER RECOMMENDATIONS

(71) Applicant: AT&T Intellectual Property I, L.P., Atlanta, GA (US)

(72) Inventors: Wei Wang, Weehawken, NJ (US); Cristina Serban, Middletown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,733

(22) Filed: Oct. 16, 2016

(65) Prior Publication Data
US 2017/0034262 A1   Feb. 2, 2017

Related U.S. Application Data

(63) Continuation of application No. 14/497,477, filed on Sep. 26, 2014, now Pat. No. 9,485,615.

(51) Int. Cl.
| | | |
|---|---|---|
| *H04W 4/02* | (2018.01) | |
| *H04L 29/08* | (2006.01) | |
| *H04W 4/021* | (2018.01) | |
| *H04W 12/12* | (2009.01) | |
| *H04M 3/42* | (2006.01) | |
| *H04W 4/50* | (2018.01) | |
| *H04W 88/02* | (2009.01) | |

(52) U.S. Cl.
CPC .......... *H04L 67/1061* (2013.01); *H04L 67/12* (2013.01); *H04M 3/42178* (2013.01); *H04W 4/02* (2013.01); *H04W 4/021* (2013.01); *H04W 4/50* (2018.02); *H04W 12/12* (2013.01); *H04W 88/02* (2013.01)

(58) Field of Classification Search
CPC ..... H04L 67/00; H04L 67/1061; H04L 67/12; H04M 3/42178; H04W 4/021; H04W 88/02; H04W 4/02; H04W 4/001; H04W 12/12
USPC ....... 455/411, 419–420, 414.1–414.4, 422.1, 455/41.1–41.2, 556
See application file for complete search history.

(56) References Cited

U.S. PATENT DOCUMENTS

| | | |
|---|---|---|
| 7,308,703 B2 | 12/2007 | Wright et al. |
| 7,478,420 B2 | 1/2009 | Wright et al. |
| 7,787,776 B2 | 8/2010 | Sharma |
| 8,056,133 B1 | 11/2011 | Yao et al. |
| 8,233,883 B2 | 7/2012 | DeFroment |
| 9,053,321 B2 * | 6/2015 | Duncan ................. G06F 21/567 |
| 9,088,867 B2 | 7/2015 | Zhang |

(Continued)

*Primary Examiner* — Khawar Iqbal
(74) *Attorney, Agent, or Firm* — Scott P. Zimmerman, PLLC

(57) ABSTRACT

A recommendation for a user is generated in response to a user request. The recommendation can pertain to whether a user should download and install a mobile device application and is based on a number of responses received from other mobile devices within a specified distance from the mobile device at which the recommendation was requested. Recommendations can also be requested and generated by various other devices in machine-to-machine networks. Recommendations can pertain to policy enforcement and device component performance or operation.

20 Claims, 3 Drawing Sheets

(56) References Cited

U.S. PATENT DOCUMENTS

| | | | |
|---|---|---|---|
| 9,219,707 B1* | 12/2015 | Mesropian | G06F 21/564 |
| 9,230,134 B1* | 1/2016 | Grigera | G06F 21/6245 |
| 9,313,218 B1* | 4/2016 | Savant | H04L 63/1416 |
| 9,602,623 B2* | 3/2017 | Kuusilinna | H04L 67/16 |
| 9,756,115 B2* | 9/2017 | Chan | H04L 67/06 |
| 2008/0003997 A1 | 1/2008 | Parkkinen | |
| 2008/0066182 A1 | 3/2008 | Hickmott et al. | |
| 2010/0198871 A1 | 8/2010 | Stiegler | |
| 2011/0029786 A1 | 2/2011 | Raffard et al. | |
| 2011/0238751 A1 | 9/2011 | Belimpasakis | |
| 2012/0329388 A1 | 12/2012 | Royston et al. | |
| 2014/0006265 A1* | 1/2014 | Ye | H04M 1/72525 |
| | | | 705/39 |
| 2014/0096246 A1* | 4/2014 | Morrissey | G06F 21/51 |
| | | | 726/23 |
| 2014/0187152 A1 | 4/2014 | Johnson et al. | |
| 2014/0181518 A1 | 6/2014 | Kim et al. | |
| 2014/0189352 A1* | 7/2014 | Baskaran | H04L 63/0428 |
| | | | 713/168 |
| 2014/0195793 A1* | 7/2014 | Lindteigen | H04L 63/123 |
| | | | 713/100 |
| 2014/0215620 A1* | 7/2014 | Hayrynen | H04L 63/1416 |
| | | | 726/23 |
| 2014/0269514 A1 | 9/2014 | Leppanen | |
| 2014/0330895 A1 | 11/2014 | Kang | |
| 2015/0066915 A1 | 3/2015 | Golder | |
| 2015/0112738 A1 | 4/2015 | Marinaro | |
| 2015/0134653 A1 | 5/2015 | Bayer | |
| 2015/0180851 A1 | 6/2015 | Zou | |
| 2015/0180902 A1 | 6/2015 | Biswas | |
| 2015/0186669 A1 | 7/2015 | Nicolaou | |
| 2015/0242874 A1* | 8/2015 | Voigt | G06Q 30/0214 |
| | | | 705/14.16 |
| 2015/0339111 A1 | 11/2015 | Kedia | |
| 2016/0005003 A1 | 1/2016 | Norris | |
| 2016/0157171 A1 | 6/2016 | Lidstrom | |
| 2016/0234625 A1* | 8/2016 | Wang | H04L 67/06 |
| 2017/0076353 A1* | 3/2017 | Mehta | G06Q 30/0282 |
| 2017/0289241 A1* | 10/2017 | Singh | H04L 67/10 |

\* cited by examiner

METHODS, SYSTEMS, DEVICES, AND PRODUCTS FOR PEER RECOMMENDATIONS

CROSS-REFERENCE TO RELATED APPLICATION

This application is a continuation of U.S. application Ser. No. 14/497,477 filed Sep. 26, 2014 and since issued as U.S. Pat. No. 9,485,615, and incorporated herein by reference in its entirety.

BACKGROUND

The present disclosure relates generally to communications among devices located nearby one another, and more particularly to local peer-to-peer communications for providing recommendations.

Various devices are capable of communicating data with each another using various types of networks and protocols. These devices are generally configured to communicate data with each another for specific purposes. For example, various mobile devices are configured to communicate with each another to facilitate the transmission of a message from one user to another. Although various devices communicate with one another, this communication is typically limited to predefined functions that the devices are built to support.

SUMMARY

In one embodiment, a method includes receiving a request at a particular mobile device for a recommendation and identifying a plurality of mobile devices that are located within a specified distance from a particular mobile device. A mobile device parameter query is then transmitted to the plurality of mobile devices. The particular mobile device receives responses from the plurality of mobile devices comprising mobile device operational parameters and the particular mobile device generates a recommendation based on the responses. In one embodiment the mobile device operational parameters can include traffic statistics, processor and memory statistics, and battery statistics. In one embodiment, the recommendation indicates that a mobile application is safe to install based on the plurality of mobile device parameters received in the responses. In one embodiment, the request specifies a type of recommendation and the query from the particular mobile device and the specified distance is based on the type of recommendation requested.

An apparatus and computer readable medium for generating recommendations is also described herein.

DETAILED DESCRIPTION

Various electronic devices are capable of communicating data with one another. This communication capability can be used to provide a user of a particular electronic device with various information referred to herein as a recommendation. Recommendations can be generated and provided to a user based on information received from other devices that are near the particular electronic device. Information is received from other devices in response to a query based on the subject matter to which the recommendation pertains. The recommendation is generated based on the information received.

Figure 1:
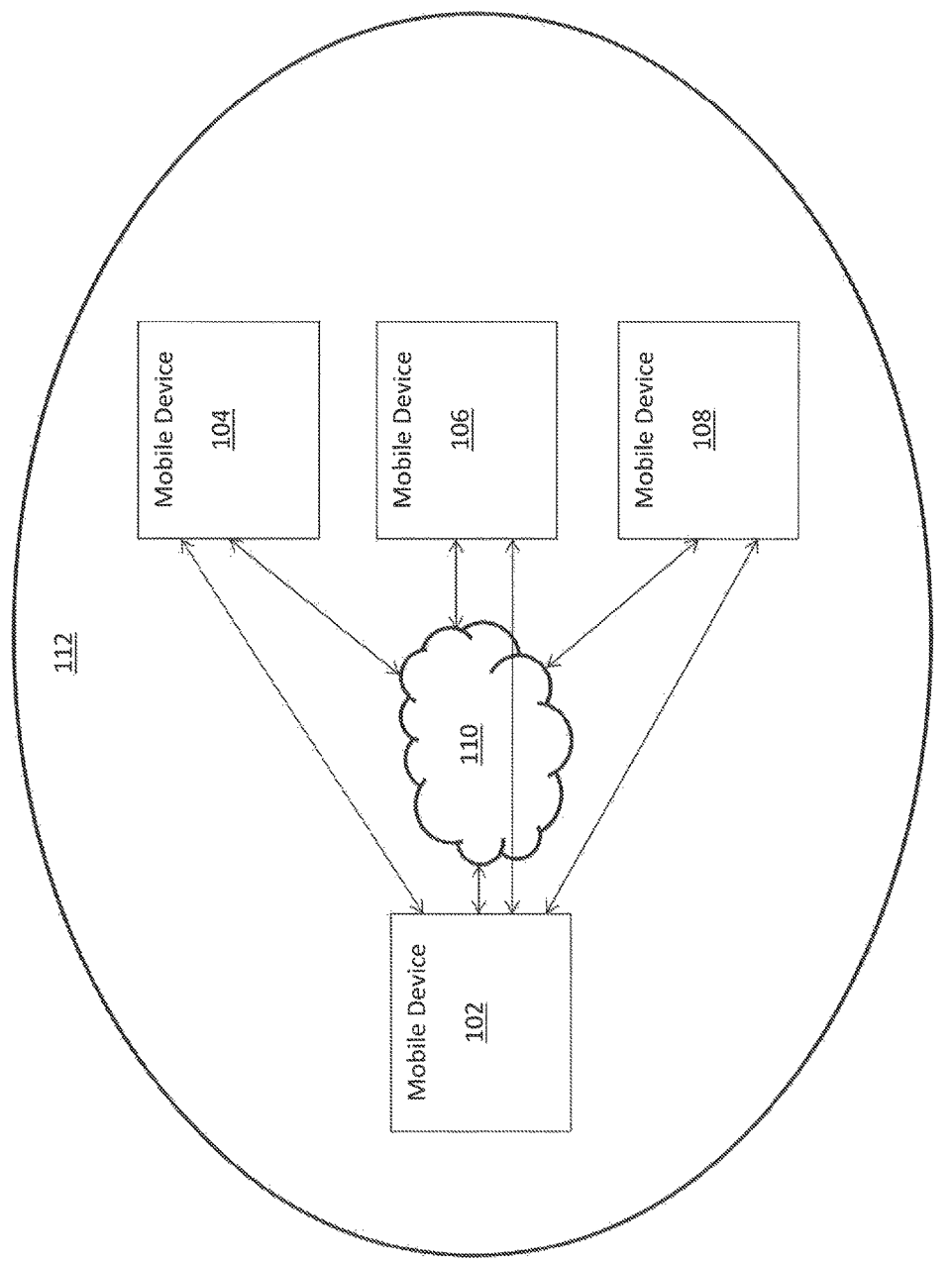
FIG. 1 shows several mobile devices in communication with one another.

FIG. 1 depicts mobile device 102 which, in one embodiment, is a smart phone, but can be any other type of device such as a tablet, computer, smart sensor, etc. Mobile device 102 is located in geographic area 112 and can communicate wirelessly via network 110 with other mobile devices 104, 106, and 108, which are also located in geographic area 112. Mobile devices 104, 106, and 108, in one embodiment, are smart phones, but can be other types of devices as described in connection with mobile device 102. Mobile devices 104, 106, and 108 are devices identified as being located in a geographic area 112 or within a specified distance from mobile device 102. Mobile devices 102, 104, 106, and 108 communicate wirelessly with one another using wireless networks such as cellular or Wi-Fi. Mobile devices 102, 104, 106, and 108 may also communicate wirelessly with one another using direct communication such as Wi-Fi Direct, Bluetooth, etc. as shown in FIG. 1 by double headed arrows connecting mobile devices 104, 106, and 108 with mobile device 102.

In one embodiment, each of mobile devices 102, 104, 106 and 108 shown in FIG. 1 is capable with communicating with one another and stores software configured to provide a recommendation to a user in response to a request for a recommendation. In one embodiment, the recommendation is based on data associated with other mobile devices that is collected by a particular mobile device via queries and responses. The software can be configured to establish a communication network among multiple devices in order to receive data from other devices in response to queries and generate the recommendation.

Figure 2:
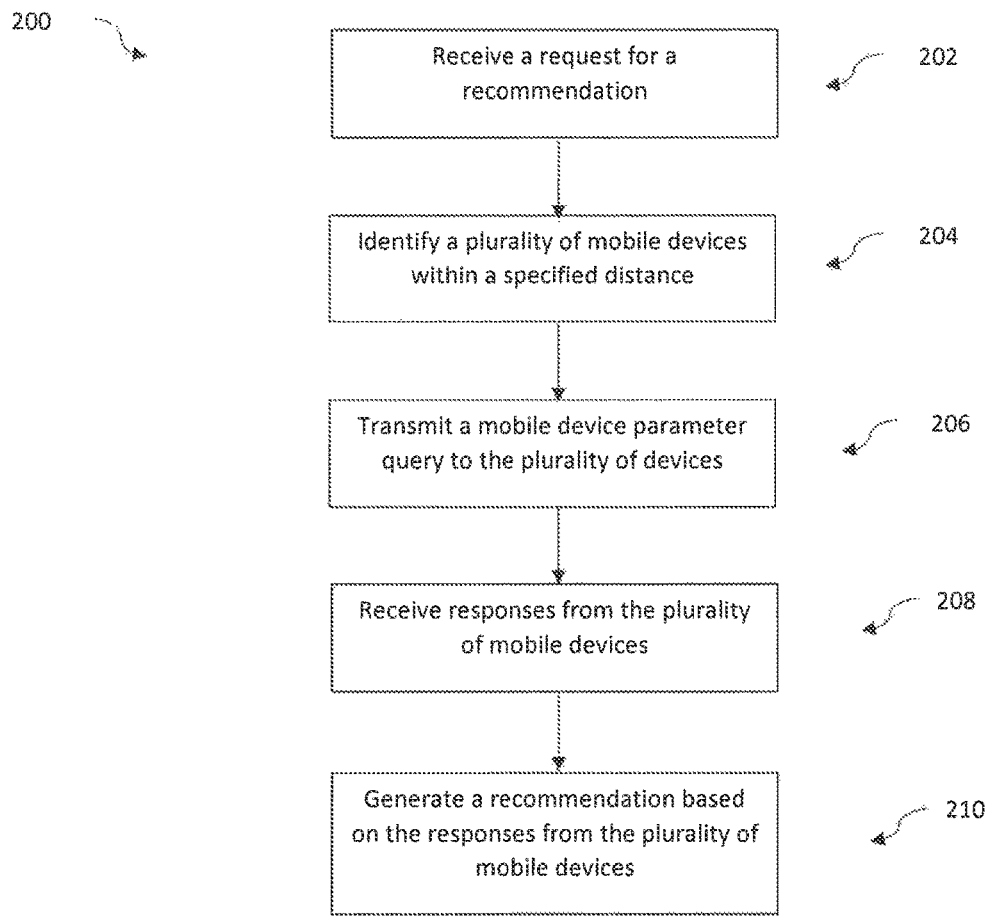
FIG. 2 is a flowchart depicting a method for generating a recommendation for a user according to one embodiment.

FIG. 2 depicts method 200 for generating a recommendation for a user according to one embodiment. At step 202, a request is received at mobile device 102 for a recommendation. At step 204, a plurality of mobile devices, such as mobile devices 104, 106, and 108 located in a particular geographic area or within a specified distance from the mobile device at which the request was received (e.g., mobile device 102) are identified. At step 206, a mobile device parameter query is sent to the plurality of mobile devices (e.g., mobile devices 104, 106, and 108 identified in step 204). At step 208, responses from the plurality of mobile devices are received, for example, by mobile device 102. At step 210, a recommendation is generated by mobile device 102 based on the responses from the plurality of mobile devices (i.e., mobile devices 104, 106, and 108).

The devices shown in FIG. 1 can communicate with one another according to the method show in FIG. 2 in order to provide a user with a recommendation pertaining to a variety of subject matter as described below.

In one embodiment, each of mobile devices 102, 104, 106, and 108 is capable of downloading, installing, and running one or more applications (also referred to as "apps"). An application can be any program capable of being executed by a mobile device and may include games, utilities, general productivity, and information transmission and retrieval. Most apps are not malicious and utilize an amount of mobile device resources commensurate with the function the app is intended to perform. However, some apps are malicious and may contain additional covert or hidden functions (e.g., functions an app is performing that a user is unaware of). In addition, some apps may utilize more resources than expected based on the functions the app is to perform.

In one embodiment, a recommendation app loaded onto a plurality of mobile devices is used to generate a recommendation to a user pertaining to whether a user should download and install a new app. The recommendation app loaded onto the plurality of mobile devices is configured to establish a network (e.g., a local peer-to-peer network) among the plurality of mobile devices. The recommendation app and the local peer-to-peer network are utilized to generate the recommendation to a user. In one embodiment, the recommendation app is downloaded and installed to each of the plurality of mobile devices in response to user input such as a respective user of one of the plurality of mobile devices selecting the recommendation app for download and install. In other embodiments, the recommendation app is preloaded onto mobile devices. In one embodiment, the recommendation is based on the assumption that most apps downloaded and installed to mobile devices are 1) not malicious and 2) do not utilize an excessive amount of resources. As such, the number of devices hindered by apps (also referred to as infected devices) is assumed to be a small minority. Thus, in one embodiment, recommendations are generated based on what is referred to as a "good majority principle" which means that it is assumed that the majority of devices are not infected devices.

In one embodiment, method 200 of FIG. 2 is performed by a recommendation app loaded onto each of a plurality of mobile devices (e.g., user devices such as smart phones). At step 202, a request is received at mobile device 102 for a recommendation pertaining to whether a user should download and install a new app. At step 204, a plurality of mobile devices, such as mobile devices 104, 106, and 108 located in a particular geographic area or within a specified distance from the mobile device at which the request was received (e.g., mobile device 102) are identified. In one embodiment, identification of the plurality of mobile devices in a particular geographic area or within the specified distance is in response to the request for the recommendation. In one embodiment, the particular geographic area and/or the specified distance varies based on one or more factors. The particular geographic area or the specified distance may be based on the type of recommendation requested by the user. For example, a particular geographic area or a specified distance for a recommendation as to whether an app should be installed may be selected to include all mobile devices of employees within a building housing a business of which a user requesting a recommendation is an employee. The distance can depend on the range of the direct communication method or protocol used (such as WiFi Direction, Bluetooth, etc.) It can also depend on factors specific to a current query. For example, the distance can be based on geographic proximity (such as, a specific business building, an entire corporate campus, etc.). The distance may also depend on other factors such as whether a cellular or WiFi network is being used or association factors among the peers (such as, same project group, etc.).

At step 206, a mobile device parameter query is sent to the plurality of mobile devices (e.g., mobile devices 104, 106, and 108 identified in step 204). In one embodiment, the mobile device parameter query is sent to a subset of the plurality of mobile devices based on the recommendation requested. For example, if only a portion of the plurality of mobile devices have installed the app to which the recommendation pertains, then only that portion of the plurality of mobile devices will be sent the mobile device parameter query. In one embodiment, the mobile device parameter query includes requests for mobile device information including resource usage and traffic statistics. In one embodiment, resource usage includes data and statistics for processor usage, memory usage, and battery usage, as well as other parameters. In one embodiment, the parameter query can pertain to one or more of version of a business policy on the mobile device, policy settings for a required version of an operating system, anti-virus software, anti-malware software, user/security/network group, authentication methods, virtual private network access, enterprise app store, app/data protection on device, logging and auditing.

At step 208, responses from the plurality of mobile devices are received, for example, by mobile device 102. At step 210, a recommendation is generated by the recommendation app of mobile device 102 based on the responses from the plurality of mobile devices (i.e., mobile devices 104, 106, and 108). In one embodiment, the recommendation pertains to whether a user should install an application and the recommendation is generated based on the information contained in the responses. For example, in response to a request for a recommendation as to whether a user should install a particular application, information received in responses from the plurality of mobile devices is analyzed. The responses are analyzed to determine how the operation and/or performance of each of the plurality of mobile devices changed after the app was installed. In one embodiment, changes in operation and/or performance of the majority of the plurality of mobile devices are determined in order to prevent a particular mobile device from adversely affecting generation of the recommendation in error (e.g., a particular mobile device that appears to have been affected by a particular app but was, in fact, affected by a different app). In one embodiment, if the app is determined to have had an adverse effect on the mobile devices in which the app was installed (e.g., an unacceptable change or decrease in performance), a recommendation is generated indicating that the user should not download and install the app. In one embodiment, the recommendation includes information indicating how installation of the app affected the operation and/or performance of the mobile devices on which the app was installed. In one embodiment, a threshold is determined by analyzing device behavior before and after app installation, and comparing device performance, such as an increase in CPU utilization, slow down of response, etc.

Recommendations pertaining to subject matter other than whether or not to install an app can also be provided to a user. Recommendations pertaining to policy enforcement, file sharing, and machine-to-machine communications can also be provided to a user in various other embodiments.

In one embodiment, policy enforcement is facilitated using the recommendation app and a peer-to-peer network established by the recommendation app among devices to generate recommendations pertaining to policy enforcement. For example, a corporate policy may prohibit audio and/or visual recording of certain meetings. Also, policy may dictate that all devices be muted (i.e., set to silent or audio output shut off) allowing only tactile (e.g., vibration) notifications. Policy may also dictate other actions users may take, such as local peer-to-peer sharing. In one embodiment, a first mobile device, which may be associated with a supervisor or facilitator of a meeting, may request a recommendation concerning policy enforcement for the meeting. A plurality of mobile devices in a particular geographic area or within a specified distance from the first mobile device is determined by the first mobile device. In one embodiment, the particular geographic area and/or the specified distance is based on a location of the first mobile device and the policies to be enforced. For example, if the first mobile device is located in a conference room at the time of a meeting, the particular geographic area may be determined to be the area of the conference room. As such, in this example, mobile devices located within the conference room are identified as being located in the particular geographic area. The first device then transmits a mobile device parameter query to the plurality of devices in a particular geographic area or within a specified distance from the first mobile device. The mobile device parameter query, in one embodiment, identifies information to be provided by each of the plurality of devices which may include a sound output status of the device, whether the device is capable of audio and/or visual recording, whether the device is currently recording, whether the device is capable of sharing files via a peer-to-peer network, whether the device is currently sharing files via a peer-to-peer network, whether a device is configured to provide tactile alerts (i.e., vibration alerts) etc. The first device then receives responses from the plurality of mobile devices and generates a recommendation to the user of the first mobile device. In one embodiment, the recommendation provides information about the each of the plurality of mobile devices including whether each of the plurality of mobile devices is in compliance with the policies. With this information, the user of the first mobile device may then take corrective action as necessary, such as reminding those in attendance to mute their devices, etc.

In one embodiment, recommendations pertain to policy enforcement. This allows a user to ensure that others comply with policies generally pertaining to the use and operation of mobile devices. Policy enforcement may be facilitated as follows. A peer-to-peer network is set up in response to a request for policy enforcement by one of a plurality of mobile devices within a specified distance of one another or within a particular geographic area (e.g., all mobile devices in a conference room). A leader is randomly selected from the plurality of mobile devices and gathers information concerning mobile device configuration from each of the plurality of mobile devices. The leader then checks to see that each of the plurality of mobile devices satisfies the policy. After a specified period of time, a new leader (i.e., one of the plurality of mobile devices) is randomly chosen from among the plurality of mobile devices. The new leader gathers information concerning mobile device configuration from each of the plurality of mobile devices so that it can be determined whether the plurality of mobile devices continue to satisfy the policies. In one embodiment, this manner of selecting a new leader after a specified period of time continues periodically (e.g., every 5, 10, or 15 minutes, etc.) until the meeting is over. Selecting a new leader randomly after a specified period of time is referred to as "round-robin." This round-robin method, in one embodiment, assists in preventing policy infractions from occurring after an initial policy check, and can also prevent a possibly malicious leader (e.g., infected device or malicious user) from corrupting the communications or query protocols.

In one embodiment, peer-to-peer file sharing among mobile devices for the duration of a meeting of the users associated with the mobile devices may be facilitated by the recommendation app and a peer-to-peer network established by the recommendation app among a plurality of mobile devices. In one embodiment, files shared among the mobile devices in the peer-to-peer network may be deleted from mobile devices (e.g., the sender's and/or the recipient's devices) by an app on each of the mobile devices at the end of the meeting. The deletion of files may be in accordance with certain policies created by a business or employer who employs the users.

In one embodiment, policies are stored on the mobile device. In other embodiments, policies are stored in other locations such as a server associated with the entity or business to which the policies pertain. In embodiments where the policies are not stored on a mobile device, a server, such as a server associated with a business to which the policies pertain, may be accessed to obtain the policies.

In one embodiment, information collected via mobile device parameter queries includes data related to the mobile device's processor and memory. In addition, network traffic information can also be tracked for a mobile device to be shared with other mobile devices. In one embodiment, certain information may not be available but can be inferred. For example, information concerning network traffic congestion may not be available but this information can be inferred by retransmitting packets several times and determining if there is a delay in transmission.

In one embodiment, a virtual peer-to-peer group can be set up on demand via a first mobile device and one or more additional mobile devices via apps installed on the devices. The virtual peer-to-peer group can be used to share information among mobile devices without having to transmit information through an intermediary such as a server or network. The information shared among mobile devices can include mobile device parameters, network information from the viewpoint of a mobile device (e.g., usage, abnormal observations such as high packet loss, etc.) as well as data such as files.

In one embodiment, recommendations pertain to the transfer of information among devices in a machine-to-machine network. In such embodiments, machine-to-machine communication is facilitated for devices in the internet of things. For example, multiple nearby devices can communicate with one another to transfer information that can be used to determine whether certain devices are functioning properly. In some embodiments using machine-to-machine networks, the devices typically communicate through a local proxy or gateway. In such embodiments, the distance depends on the placement around the proxy/gateway (e.g., physical or network location). If the devices communicate directly with one another, the distance may depend on the capabilities of their communication protocols.

In one embodiment, machine-to-machine communication pertains to vehicles travelling near one another. For example, multiple vehicles travelling near one another on a road can communicate with each other. In one embodiment, a first vehicle can request a recommendation pertaining to a sensor in response to a determination that the sensor is not functioning properly (e.g., the sensor value has not changed in the last X hours). In such an embodiment, in response to the first vehicle determining that a sensor may not be functioning properly, the first vehicle identifies a plurality of vehicles within a specified distance of the first vehicle. The first vehicle then transmits a vehicle parameter query to the plurality of vehicles and receives responses from the plurality of vehicles. A recommendation is generated based on the responses from the plurality of vehicles. In one embodiment, sensor values from a majority of the plurality of vehicles are used to generate an average sensor value that can be compared to the sensor value of the first vehicle. If the sensor value of the first vehicle does not match the average sensor value within a threshold, the recommendation indicates that the sensor of the first vehicle does not match the majority or other sensors. The recommendation may also identify the sensor of the first vehicle as malfunctioning. The information in the recommendation can then be used by the first vehicle to alert a driver of the vehicle that there is a problem with the vehicle. The information in the recommendation can also be used by the first vehicle to take corrective actions to account for the malfunctioning sensor.

In one embodiment, machine-to-machine communications, requests for recommendations, and recommendations can be used in other environments, such as multiple devices located in a specific geographic area (e.g., building control systems utilizing multiple devices and sensors) or within a specified distance from a particular device. In other embodiments, machine-to-machine communication can be between unmanned vehicles to share information among the unmanned vehicles (e.g., speed, direction, etc.) and recommendations can be used to provide drivers, operators, and/or supervisors with information such as operational status, warnings, faults, etc. For example, in one embodiment, multiple devices located in a building are capable of communicating with one another. A first device detects a potential problem with one of its sensors, in this example, a barometric pressure sensor. The first device identifies a plurality of devices within the building and transmits a device parameter query to the plurality of devices and receives responses from the plurality of devices. In this embodiment, the majority of sensors should report the same value or a value close to each other. An average value is then determined based on the majority of sensor values and all sensor values are compared to the average value. Sensor values that do not match the average value within a threshold are considered to be possibly malfunctioning. In response to this determination, corrective action can be taken with respect to possibly malfunctioning sensors. For example, the value for the possibly malfunctioning sensor can be replaced with a value from another nearby sensor. In addition, the possibly malfunctioning sensor can be identified for further troubleshooting and/or replacement.

Figure 3:
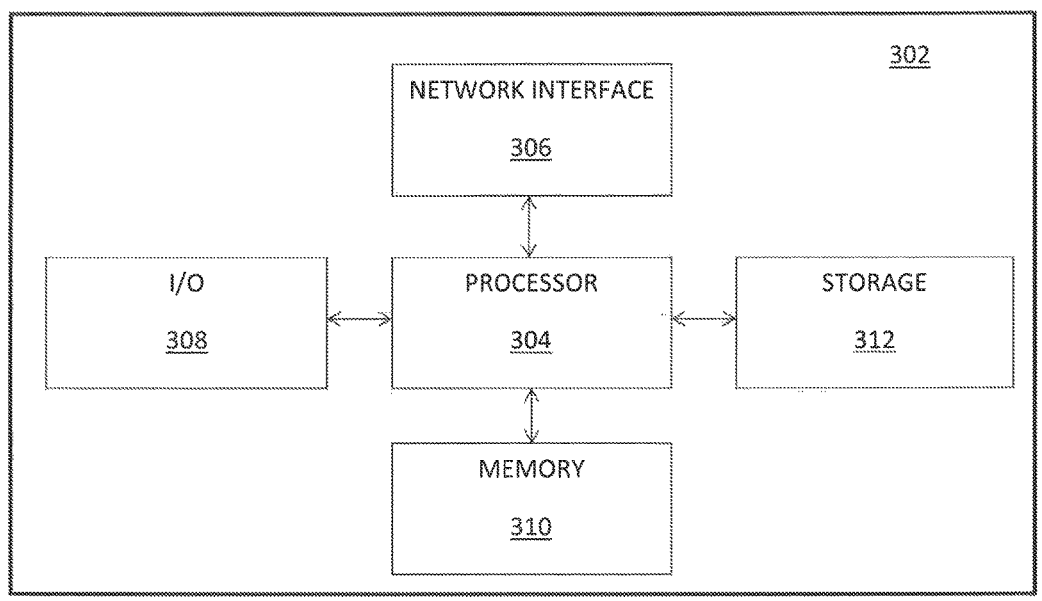
FIG. 3 depicts a high-level block diagram of a computer which can be used to implement a mobile device.

The method shown in FIG. 2, each of mobile devices 102, 104, 106, and 108, building control devices, and devices located on vehicles may be implemented on a computer. A high-level block diagram of such a computer is illustrated in FIG. 3. Computer 302 contains a processor 304 which controls the overall operation of the computer 302 by executing computer program instructions which define such operation. The computer program instructions may be stored in a storage device 312, or other computer readable medium (e.g., magnetic disk, CD ROM, etc.), and loaded into memory 310 when execution of the computer program instructions is desired. Thus, the method steps of FIG. 2 can be defined by the computer program instructions stored in the memory 310 and/or storage 312 and controlled by the processor 304 executing the computer program instructions. For example, the computer program instructions can be implemented as computer executable code programmed by one skilled in the art to perform an algorithm defined by the method steps of FIG. 2. Accordingly, by executing the computer program instructions, the processor 304 executes an algorithm defined by the method steps of FIG. 2. The computer 302 also includes one or more network interfaces 306 for communicating with other devices via a network. The computer 302 also includes input/output devices 308 that enable user interaction with the computer 302 (e.g., display, keyboard, mouse, speakers, buttons, etc.) One skilled in the art will recognize that an implementation of an actual computer could contain other components as well, and that FIG. 3 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method, comprising:
receiving, by a mobile device, a request to download a software application;
determining, by the mobile device, a geographic area of operation;
identifying, by the mobile device, a different mobile device located within the geographic area of operation, the different mobile device having already downloaded and executed the software application;
retrieving, by the mobile device, device information from the different mobile device located within the geographic area of operation, the device information describing the software application already downloaded and executed by the different mobile device; and
generating, by the mobile device, a recommendation prior to the download of the software application, the recommendation based on the device information retrieved from the different mobile device that already downloaded and executed the software application, the recommendation indicating that the software application is at least one of safe to install and unsafe to install.

2. The method of claim 1, further comprising displaying the recommendation.

3. The method of claim 1, further comprising determining a distance to the different mobile device.

4. The method of claim 1, further comprising receiving a request for the recommendation.

5. The method of claim 1, further comprising sending a query to the different mobile device, the query requesting the device information describing an execution of the software application.

6. The method of claim 1, further comprising determining the software application is malicious.

7. The method of claim 1, further comprising wirelessly communicating with the different mobile device.

8. The method of claim 1, further comprising establishing a communication with the different mobile device via a peer-to-peer network.

9. A system, comprising:
a hardware processor; and
a memory device, the memory device storing instructions, the instructions when executed causing the hardware processor to perform operations, the operations comprising:
receiving a request to download a software application;
determining a geographic area of operation;
identifying a mobile device located within the geographic area of operation that has already downloaded the software application;
retrieving device information from the mobile device located within the geographic area of operation, the device information describing an execution of the software application already downloaded by the mobile device; and generating a recommendation prior to the download of the software application, the recommendation based on the device information retrieved from the mobile device that already downloaded the software application, the recommendation indicating that the software application is at least one of safe to install and unsafe to install.

10. The system of claim 9, wherein the operations further comprise displaying the recommendation.

11. The system of claim 9, wherein the operations further comprise determining a distance to the different mobile device.

12. The system of claim 9, wherein the operations further comprise receiving a request for the recommendation.

13. The system of claim 9, wherein the operations further comprise sending a query to the mobile device, the query requesting the device information describing the execution of the software application.

14. The system of claim 9, wherein the operations further comprise determining the software application is malicious.

15. The system of claim 9, wherein the operations further comprise wirelessly communicating with the mobile device.

16. The system of claim 9, wherein the operations further comprise establishing a communication with the mobile device via a peer-to-peer network.

17. A storage device storing computer program instructions which, when executed on a hardware processor, cause the hardware processor to perform operations, the operations comprising:

receiving a request to download a software application;

determining a geographic area of operation;

identifying a mobile device located within the geographic area of operation that has already downloaded the software application;

prior to the download of the software application, retrieving device information from the mobile device located within the geographic area of operation, the device information describing an execution of the software application already downloaded by the mobile device; and prior to the download of the software application, generating a recommendation associated with the software application, the recommendation based on the device information retrieved from the mobile device that already downloaded the software application, the recommendation indicating that the software application is at least one of safe to install and unsafe to install.

18. The storage device of claim 17, wherein the operations further comprise displaying the recommendation.

19. The storage device of claim 17, wherein the operations further comprise determining a distance to the different mobile device.

20. The storage device of claim 17, wherein the operations further comprise receiving a request for the recommendation.

* * * * *